United States Patent [19]

Perkins et al.

[11] 3,725,933
[45] Apr. 3, 1973

[54] APPARATUS AND METHOD OF SMOOTHING NAVIGATION SIGNALS

[75] Inventors: Earl Stuart Perkins, Oak Brook, Ill.; James Hobbs, Overland Park, Kans.

[73] Assignee: Butler National Corporation, Oak Brook, Ill.

[22] Filed: Sept. 11, 1970

[21] Appl. No.: 71,461

[52] U.S. Cl. .............................................. 343/106 R
[51] Int. Cl. ................................................. G01s 1/44
[58] Field of Search ...................................... 343/106

[56] References Cited

UNITED STATES PATENTS 2,912,690  11/1959  Mandel .......................... 343/106 R
3,048,842  8/1962  Parker et al. ................... 343/106 R X
3,369,238  2/1968  Stauffer et al. .................. 343/106 R Primary Examiner—Malcolm F. Hubler
Attorney—Hill, Sherman, Meroni, Gross & Simpson

[57] ABSTRACT

It is desirable to smooth the radio signals used in aircraft navigation so that maximum accuracy can be obtained in the control and operation of aircraft. The present invention provides for smoothing VOR bearing radio signals by limiting the maximum excursions which the signal can take in view of the axial parameters of the system and to adjust the maximum response with an integrator when necessary.

1 Claim, 2 Drawing Figures

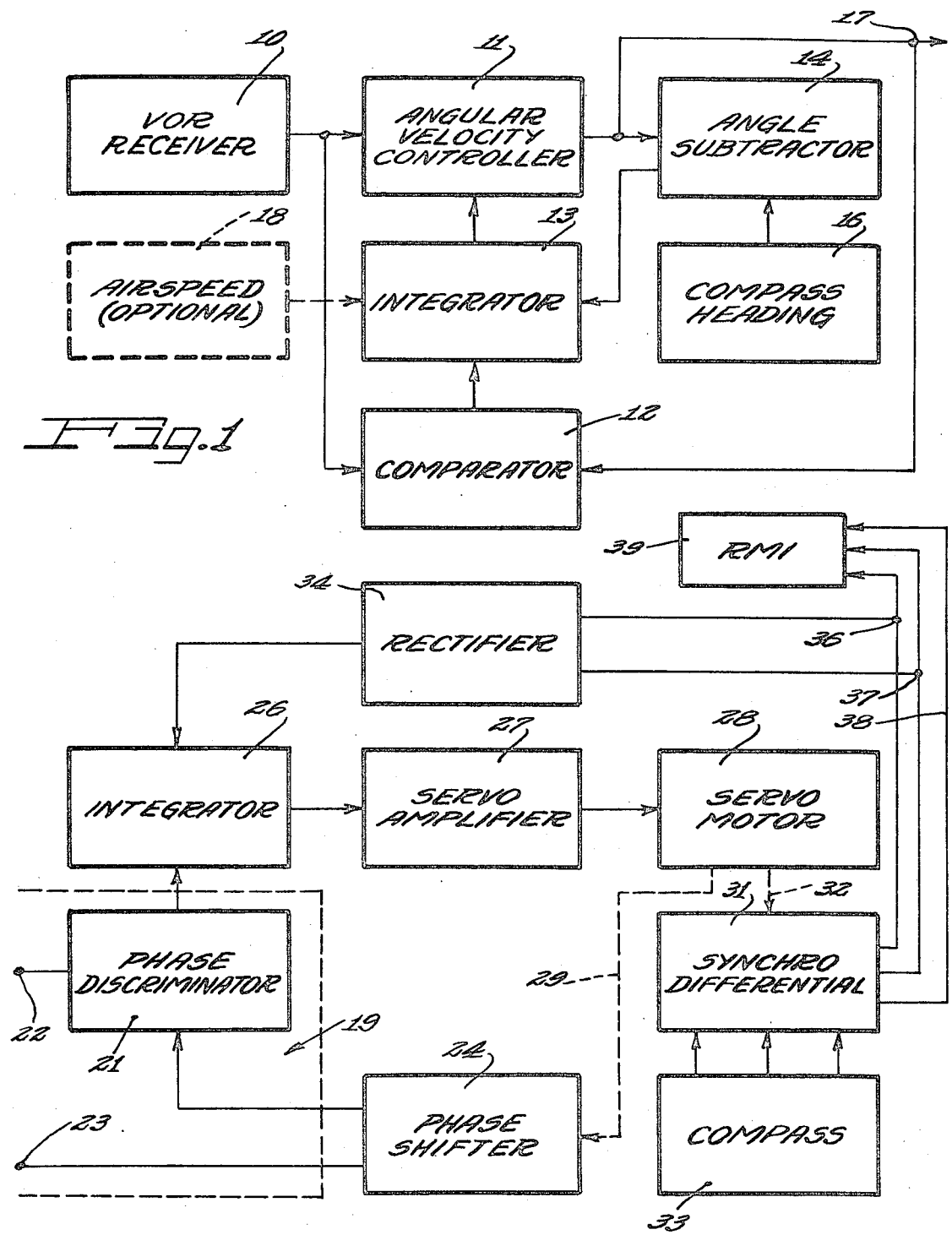

APPARATUS AND METHOD OF SMOOTHING NAVIGATION SIGNALS

BACKGROUND OF THE INVENTION

1. Field of the Invention

This invention relates in general to radio navigation systems and in particular to improved VOR systems.

2. Description of the Prior Art

VOR stations in which the bearing of an aircraft from a ground station may be determined have been known for many years. A reference 30 cycle signal and a variable 30 cycle signal are transmitted from the ground station and detected in the aircraft by comparing the variable signal with the reference signal the aircraft's relative bearing from the station may be determined. Various errors exist and are generated in the transmitter, the receiver and transmitting medium, and various interfering signals and factors cause errors in the radio signals.

SUMMARY OF THE INVENTION

The present invention provides apparatus and method of smoothing VOR signals such that many of the errors introduced into the signal due to spurious responses, and other factors are removed so that a more accurate indication of position may be made. The present invention provides for limiting the maximum rate of change of the bearing signal such that frequency components higher than those possible under the geographic situation of the aircraft and radio station are eliminated. As the aircraft's distance from the station becomes greater, the maximum change in angular bearing becomes less as a function of time. Also as the aircraft's heading relative to VOR radio changes, the maximum rate of change of bearing varies. The present invention provides means for integrating constant errors in the VOR bearing to correct indication thus providing a smoother and more constant output from the VOR receiver which provides more accurate indications than previously available.

Other objects, features and advantages of the present invention will be readily apparent from the following detailed description of certain preferred embodiments thereof taken in conjunction with the accompanying drawing.

BRIEF DESCRIPTION OF THE DRAWING

FIG. 1 is a block diagram illustrating the improved VOR system of this invention; and FIG. 2 is a specific embodiment of the concept of this invention illustrated in block form.

DESCRIPTION OF THE PREFERRED EMBODIMENT

The present invention comprises a VOR system which smooths scallops and primarily ignores noisy, rapidly varying signals from the VOR receiver which are caused by noise sources other than accurate varying signals. The system also detects D.C. components from the output of an integrator which receives the VOR signal so as to slowly correct the omni-bearing of the receiver when a D.C. component is present. If there is no D.C. component in the noisy signal, no correction is made. But, if there is a D.C. component at the output of the integrator a servo loop is closed to remove the D.C. component.

FIG. 1 illustrates the basic concepts involved and includes a VOR receiver 10 which produces an output indicative of the VOR bearing of the observer. An angular velocity controller 11 receives the output of the VOR bearing receiver 10 and limits the rate of change of the bearing signal in a controlled manner. The input to the angular velocity controller 11 and its output are supplied to a comparator 12 which compares the inputs and outputs of the angular velocity controller and if these two bearing signals differ from each other, an output is produced at the output of the comparator and is fed to an integrator 13. The output of the integrator 13 is connected to the angular velocity controller 11 so as to control the maximum rate of change of bearing which will pass through the angular velocity controller 11. Thus, if a fixed bearing error exists, the rate of change of the bearing error will be allowed to increase thus correcting the error. If, for example, the aircraft were at a great distance from the station and lying perpendicular to a selected radial, a very low angular velocity would be set into the controller 11 in that the maximum actual change in the VOR bearing would be very small. Thus, if a lag results, it could be made very small. The error would build up quite slowly and would result in a slowly building up of the allowable angular velocity which would in turn reduce the error thus resulting in a small lag.

The output of the angular velocity controller 11 is also supplied to an angle subtractor 14 which also receives an input from the compass 16. The output of the subtractor is a signal proportional to the sine of the difference between the VOR bearing and compass heading. Thus, when the aircraft is flying on a heading to or from the station (assuming no wind) the output of the angle subtractor 14 will be zero and when flying perpendicular to the radial, the output will be a maximum. The output of the subtractor 14 is connected to the integrator 13 to vary the time constant of the integrator. When flying along a radial, the maximum time constant would exist and when the aircraft is flying perpendicular to a radial the time constant would be reduced.

The output of the VOR receiver modified by this invention appears at terminal 17 and would be presented to the pilot for indicating the aircraft's position relative to the selected radial.

FIG. 2 is a block diagram of a practical embodiment of the system of FIG. 1. The VOR receiver 19 detects a 30 hertz variable signal at terminal 22 and a 30 hertz reference signal which appears at terminal 23. A phase discriminator 21 receives the variable signal from terminal 22 and the reference signal appearing at terminal 23 is supplied to a phase shifter 24 which provides an output to the phase discriminator 21. The phase discriminator 21 supplies the output of the VOR receiver to the integrator 26 which supplies an output to a servo amplifier 27 that drives a servo motor 28. Servo motor 28 has an output shaft 29 that controls the phase shift of the phase shifter 24. The servo motor 28 also drives the synchro differential 31 which also receives an input from the compass 33. The shaft position of the servo motor 28 is equal to the bearing to station. The voltage between two of the synchro wires 36 and 37 is proportional to the sine of the angular difference between the VOR bearing and the compass heading and this voltage is rectified by the rectifier 34 and the D.C. output of the rectifier 34 is supplied to the integrator 26 to adjust the time constant of the integrator 26. The servo motor 28 and the amplifier 27 are analogous to the angular velocity controller 11 illustrated in FIG. 1. The speed of the motor 28 is proportional to the amplitude of the output signal from the integrator 26. The subtractor function illustrated by block 14 in FIG. 1 is provided by the synchro differential 31 and the rectifier 34.

The RMI indicator 39 provides improved indication based on the corrected VOR signal and will be much more accurate than those presently available with VOR receivers of the prior art.

Although the output of the VOR signal is applied to an RMI indicator, it is to be realized, of course, that other presentation devices may be incorporated into the system such as, for example, to provide omni-bearing manual course selection, an output to an area navigation computer, or a digital output for use with digital computers.

The integrator 26 is one of the key components of this improved system and integrators in which the time constant may be varied with an electrical signal as illustrated in FIG. 2 are known to those skilled in the art. An integrator is a low pass filter at frequencies other than constant amplitude D.C.

It is seen that the present invention provides an improved VOR receiver wherein scallops and other errors in conventional VOR receivers are eliminated. Although it has been described with respect to preferred embodiments, it is not to be so limited as changes and modifications may be made therein which come within the full intent and scope as defined by the appended claims.

We claim:

1. A VOR navigation receiver including means for detecting variable and reference signals comprising:
   a phase shifter receiving said reference signals;
   phase discriminating means receiving said variable signal and said reference signal after it passes through said phase shifter;
   a variable time constant integrator receiving the output of said phase discriminating means;
   a servo motor connected to the output of said integrator and having an output shaft connected to said phase shifter;
   a synchro differential connected to the output shaft of said servo motor;
   a compass connected to said synchro differential;
   an indicator connected to the output of said synchro differential; and
   a rectifier connected to an output of said synchro differential and said rectifier connected to said variable time constant integrator to vary its time constant.

* * * * *